United States Patent [19]

Miyamoto et al.

[11] Patent Number: 5,061,030
[45] Date of Patent: Oct. 29, 1991

[54] OPTICAL INTEGRATED MODULATOR

[75] Inventors: Hiroshi Miyamoto; Hideto Iwaoka, both of Tokyo, Japan

[73] Assignee: Optical Measurement Technology Development Co., Ltd., Tokyo, Japan

[21] Appl. No.: 567,354

[22] Filed: Aug. 14, 1990

[30] Foreign Application Priority Data

Aug. 15, 1989 [JP] Japan .................................. 1-211013
Nov. 29, 1989 [JP] Japan .................................. 1-311467

[51] Int. Cl.$^5$ .............................................. G02B 6/10
[52] U.S. Cl. .......................................... 385/3; 385/8; 385/14
[58] Field of Search ............... 350/96.11, 96.12, 96.13, 350/96.14, 96.17

[56] References Cited

U.S. PATENT DOCUMENTS

| | | | |
|---|---|---|---|
| 4,198,116 | 4/1980 | Papuchon | 350/96.14 |
| 4,427,260 | 1/1984 | Puech et al. | 350/96.14 |
| 4,867,516 | 9/1989 | Baken | 350/96.14 |
| 4,887,878 | 12/1989 | Robinson et al. | 350/96.13 |
| 4,983,006 | 1/1991 | Nishimoto | 350/96.14 |
| 4,984,861 | 1/1991 | Suchoski, Jr. et al. | 350/96.11 |
| 5,013,114 | 5/1991 | Young | 350/96.14 |

Primary Examiner—Brian Healy
Attorney, Agent, or Firm—Cushman, Darby & Cushman

[57] ABSTRACT

This invention enables low voltage operation and improves matching in velocities of the radio frequency and of light by lowering effective index and to thereby expand modulation frequency bandwidth by structuring an optical modulator where a substrate of the material of which refractive index changes by an application of electric field description, and the insulating buffer layers are eliminated from the regions other than the electrodes. By structuring the modulator in a manner to satisfy the prescribed conditions with dimensions of each unit, the light can be matched in complete phase matching (group velocity matching) with radio frequency while characteristic impedance of the electrodes is fixed at a desired value.

8 Claims, 20 Drawing Sheets

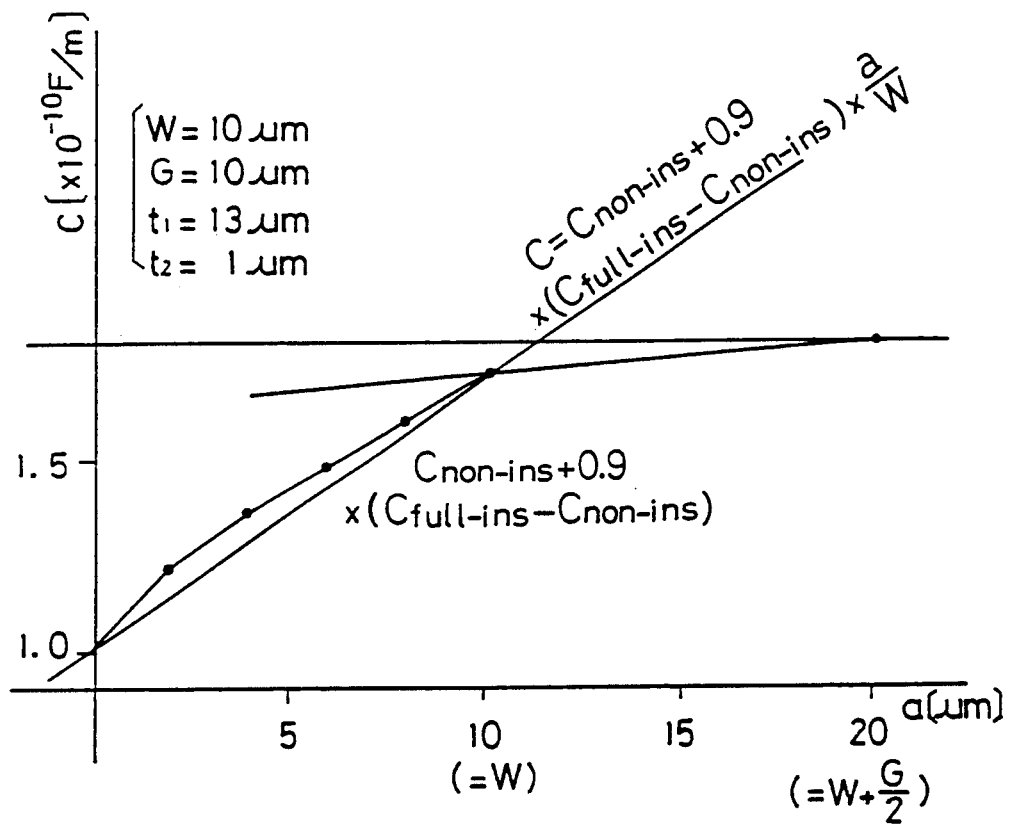
F I G. 15

OPTICAL INTEGRATED MODULATOR

FIELD OF THE INVENTION

This invention relates to an optical modulator which utilizes materials of which refractive index changes when an electric field is applied.

BACKGROUND OF THE INVENTION

There have been known optical modulators which utilize the electrooptical effect of $LiNbO_3$ or $LiTaO_3$ of which the refractive index changes when an electric field is applied.

FIG. 3 shows in section a conventional optical modulator which employs $LiNbO_3$. In the figure, an optical waveguide 2 is formed on a $LiNbO_3$ substrate 1, a $SiO_2$ buffer layer 3 is formed on the surface of the substrate 1, and electrodes 4, 4' are provided on the surface of the $SiO_2$ buffer layer 3 along the optical waveguide 2 in order to apply a radio-frequency electric field onto the waveguide 2 via the buffer layer 3.

When high frequency waves, especially microwaves, are supplied between the electrodes 4, 4' from the incident end of the waveguide 2, the electrodes 4, 4' act as a transmission line to transmit the radio frequency along the optical waveguide 2. The refractive index of the waveguide 2 changes by the electric field of the radio frequency to cause phase modulation for the light which is passing through the inside thereof. If the phase velocity of the light and the phase velocity of the radio frequency can be matched (or, exactly speaking, if group velocities thereof can be matched), then the modulation bandwidth can be expanded.

It has been, however, difficult in the prior art to match the phase velocity (group velocity) of the radio frequency and the phase velocity (group velocity) of the light because the effective index for the radio frequency was high.

In the prior art, the electric field which is necessary for modulation was applied not only on the optical waveguide where it is necessary, but also unnecessarily onto other regions.

This invention aims to solve such problems encountered in the prior art and to provide an optical modulator having a wider modulation bandwidth.

SUMMARY OF THE INVENTION

The optical modulator device according to this invention is characterized in that an insulating buffer layer is provided between the electrodes and the substrate and has a width equivalent to or narrower than the width of the electrodes.

More particularly, an insulating buffer layer preferably includes the first region formed between an electrode on the side of the optical waveguide (hereinafter referred to as "the first electrode") and the optical waveguide in a width equivalent to or narrower than the width of the first electrode, and a second region formed between another electrode provided in parallel to the first electrode (hereinafter referred to as "the second electrode") and the substrate. The second region is preferably formed to have a width equivalent to or smaller than that of the second electrode.

If it is assumed that no substrate is provided, optical waveguide or insulating buffer layer (in other words, only the two electrodes are floating in a vacuum), electrodes are preferably formed in such a shape and arrangement as to substantially satisfy the relation of $C_0 = 1/(c \cdot n_0 \cdot Z_0)$ wherein the capacitance between the electrodes is denoted as $C_0$, the refractive index of the light transmitting through the optical waveguide $n_0$, the velocity of the light $c$ and the characteristic impedance required for the two electrodes $Z_0$. When the substrate, optical waveguide and insulating buffer are added, they are preferably formed in the form and arrangement and of a material which satisfy the relation $C = n_0/(Z_0 \cdot c)$ wherein the capacitance between the electrodes is expressed as $C$. When the light velocity is expressed in the unit of m/s and the characteristic impedance $Z_0$ in $\Omega$, the unit of $C_0$ and $C$ becomes F/m.

As the insulating buffer layer is provided only underneath the electrodes, the electric field can be concentrated at a region of the optical waveguide to enable modulation by a relatively low voltage of radio frequency.

The effective index for the radio frequency may be reduced by removing an insulating buffer layer from the regions other than the area of the optical waveguide to enable a wider bandwidth modulation.

The characteristic impedance of the device will now be discussed. It is assumed that the device has such a structure that an optical waveguide is formed within a substrate of the material which has a refractive index that changes by application of an electric voltage, a first electrode is arranged along the optical waveguide in the width W and thickness $t_1$, a second electrode is arranged at a position apart from the first electrode by the distance G to have the thickness $t_1$, an insulating buffer layer is formed between the substrate and the first electrode to have the width a and thickness $t_2$, and another insulating buffer layer is provided between the second electrode and the substrate to have the thickness $t_2$. The substrate and the optical waveguide are assumed to be of a fixed material and structure.

Then the following relations hold wherein the effective index of this device for microwaves is denoted as $n_m$, the characteristic impedance of the electrode $Z_0 [\Omega]$ and the modulation bandwidth $\Delta f$ [Hz].

$$n_m = (C/C_0)^{\frac{1}{2}} \tag{1}$$

$$Z_0 = 1/(c \cdot n_m \cdot C_0) \tag{2}$$

$$\Delta f = 1.4c/(\pi |n_m - n_0| L) \tag{3}$$

wherein
C: capacitance between electrodes (unit; F/m)
$C_0$: capacitance when electrodes alone are assumed to be floating in a vacuum (unit; F/m)
c: light velocity (unit; m/s)
$n_0$: refractive index of light (no unit)
L: interaction length between the light and the radio frequency (unit; m)

When the effective index $n_m$ for microwaves coincides with the refractive index $n_0$ of the light, the phase velocity of the microwaves agrees with the phase velocity of the light. At that time, the modulation bandwidth f becomes infinite as shown in equation (3). In order the relation of $n_m = n_0$ to hold, it is necessary to have a relation as below because of the equation (2).

$$C_0 = 1/(c \cdot n_0 \cdot Z_0) \tag{4}$$

Because of the equations (1) and (4), it is necessary to have the following relation.

$$C = n_0/(Z_0 \cdot c) \quad (5)$$

A device is designed to have a structure which realizes the conditions on capacitance C and $C_0$ given by the two equations.

The value of the capacitance $C_0$ is dependent only on the electrodes if judged only from the structure of the device. To meet the value of the capacitance $C_0$ obtained by the equation (4), the forms of the electrodes, or more specifically the width W of the first electrode, the distance G between the first and second electrodes, and the thickness t of the two electrodes, are determined.

After defining the forms of the electrodes, the thickness $t_2$ and the width a of the insulating buffer layer are designed with due consideration to the structure of the waveguide and of the substrate in a manner to satisfy the equation (5) under the above conditions.

BRIEF DESCRIPTION OF THE DRAWINGS

FIG. 15 is a graph to show the relation between a and C as against the selected W, G, $t_1$ and $t_2$.

DETAILED DESCRIPTION OF THE INVENTION

Figure 1:
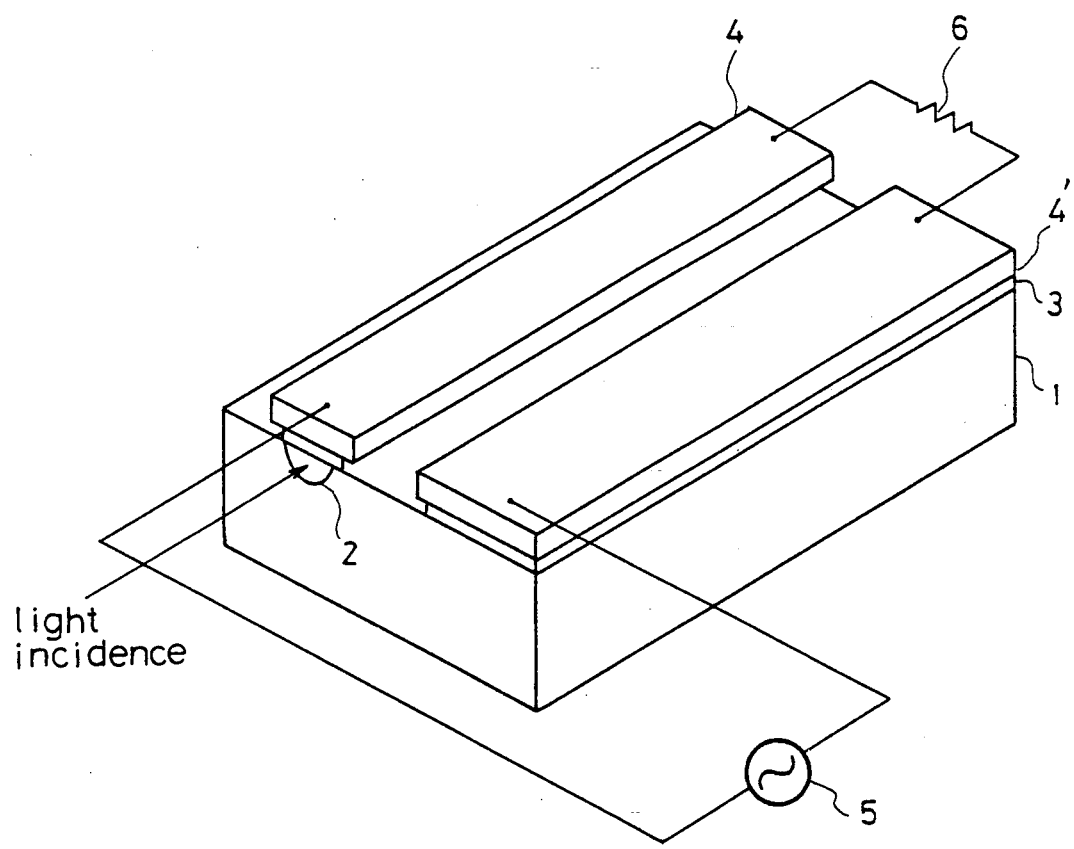
FIG. 1 is a perspective view to show an embodiment of the optical modulator according to this invention.
Figure 2:
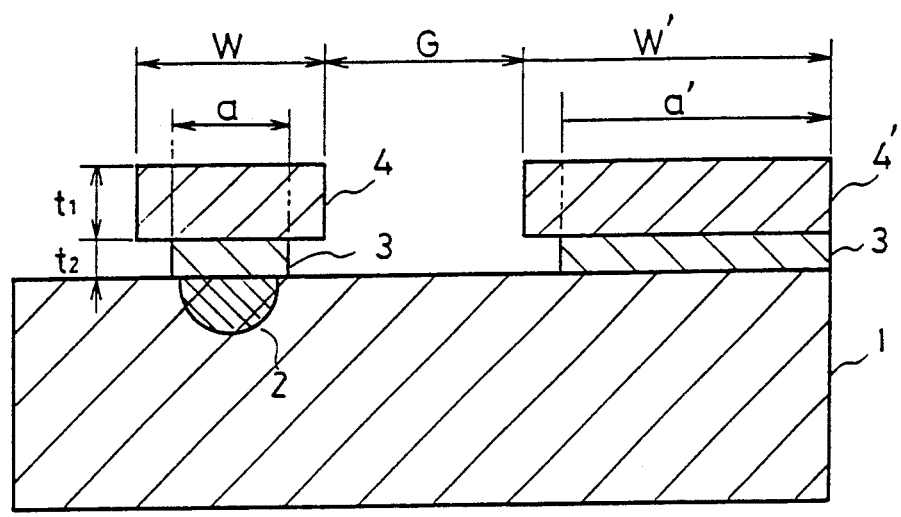
FIG. 2 is a sectional view of the optical modulator.

FIG. 1 shows an embodiment of this invention optical modulator in perspective, and FIG. 2 shows the same in section.

The optical modulator comprises a $LiNbO_3$ substrate 1, an optical waveguide 2 formed within the substrate 1, a $SiO_2$ buffer layer 3 formed on the surface of the optical waveguide 2 and the substrate 1, and electrodes 4, 4' which apply radio frequency electric field onto the optical waveguide 2 via the buffer layer 3. To each end of the electrodes 4, 4' is connected a power source 5 while the other ends are connected to a termination 6.

When a radio frequency wave, especially microwave, is inputted at the respective ends of the electrodes 4, 4' from the power source 5, the radio frequency is transmitted along the electrodes 4, 4' to reach the termination 6 connected to the other ends of the electrodes. A high frequency electric field is transmitted to the optical waveguide 2 through the $SiO_2$ buffer layer 3 to change the refractive index of the region. This changes the phase of light which is being transmitted through the optical waveguide 2.

The modulation sensitivity is determined by the overlapping status between the power distribution of the light and the radio frequency electric field, and low voltage operation becomes possible by concentrating the radio frequency electric field onto the region with a stronger power of the light.

The modulation bandwidth is restricted by the difference between the phase velocity of the light and the phase velocity of the radio frequency. As the refractive index of the light is generally lower than that of the radio frequency, the phase velocity of the light is higher than that of the radio frequency. Therefore, if the structure is adapted to reduce the refractive index of the radio frequency, the modulation bandwidth becomes expanded.

In this embodiment, the $SiO_2$ buffer layer 3 is formed between the electrodes 4, 4' and the $LiNbO_3$ substrate 1 having a width equal to or narrower than the width of the electrodes 4, 4'.

If the respective width of the electrodes 4, 4' is denoted as W, W' and the respective width of the two rows of the $SiO_2$ buffer layers 3 which contact with the electrodes 4, 4' as a, a', the relation holds as below.

$$a \leq W, \ a' \leq W'.$$

The structure allows the radio frequency electric field to concentrate in the $SiO_2$ buffer layers 3 at the bottom or on the region of the optical waveguide 2 to enable low voltage operation. By eliminating the $SiO_2$ buffer layers 3 from the regions other than the optical waveguide 2, the effective index of the radio frequency can be reduced to enable broad band modulation.

Figure 3:
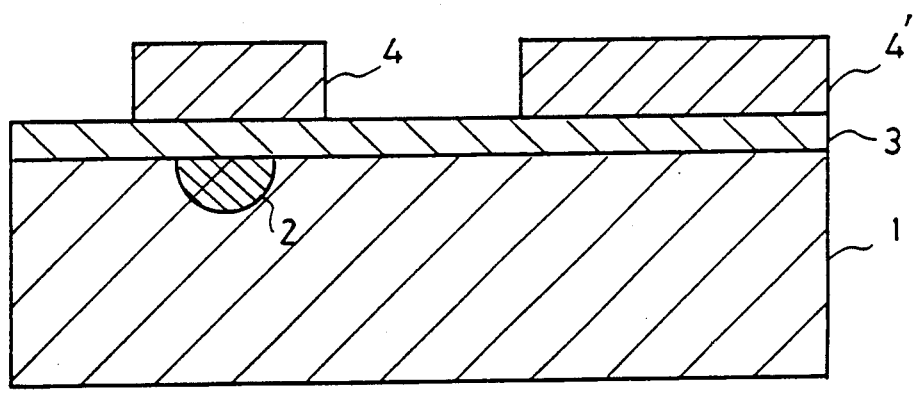
FIG. 3 is a sectional view of a prior art optical modulator for comparison.
Figure 4:
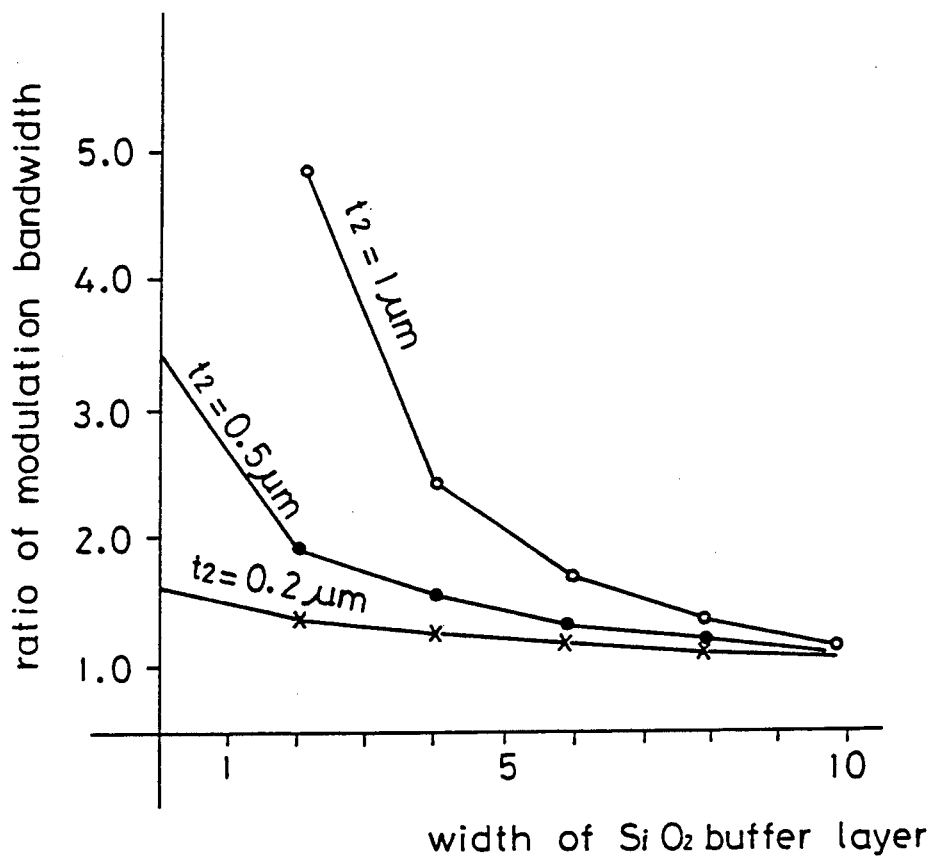
FIG. 4 is a graph to show the ratio of modulation bandwidth in calculated values of the embodiment and of the prior art as against the width of an insulating buffer layer.
Figure 5:
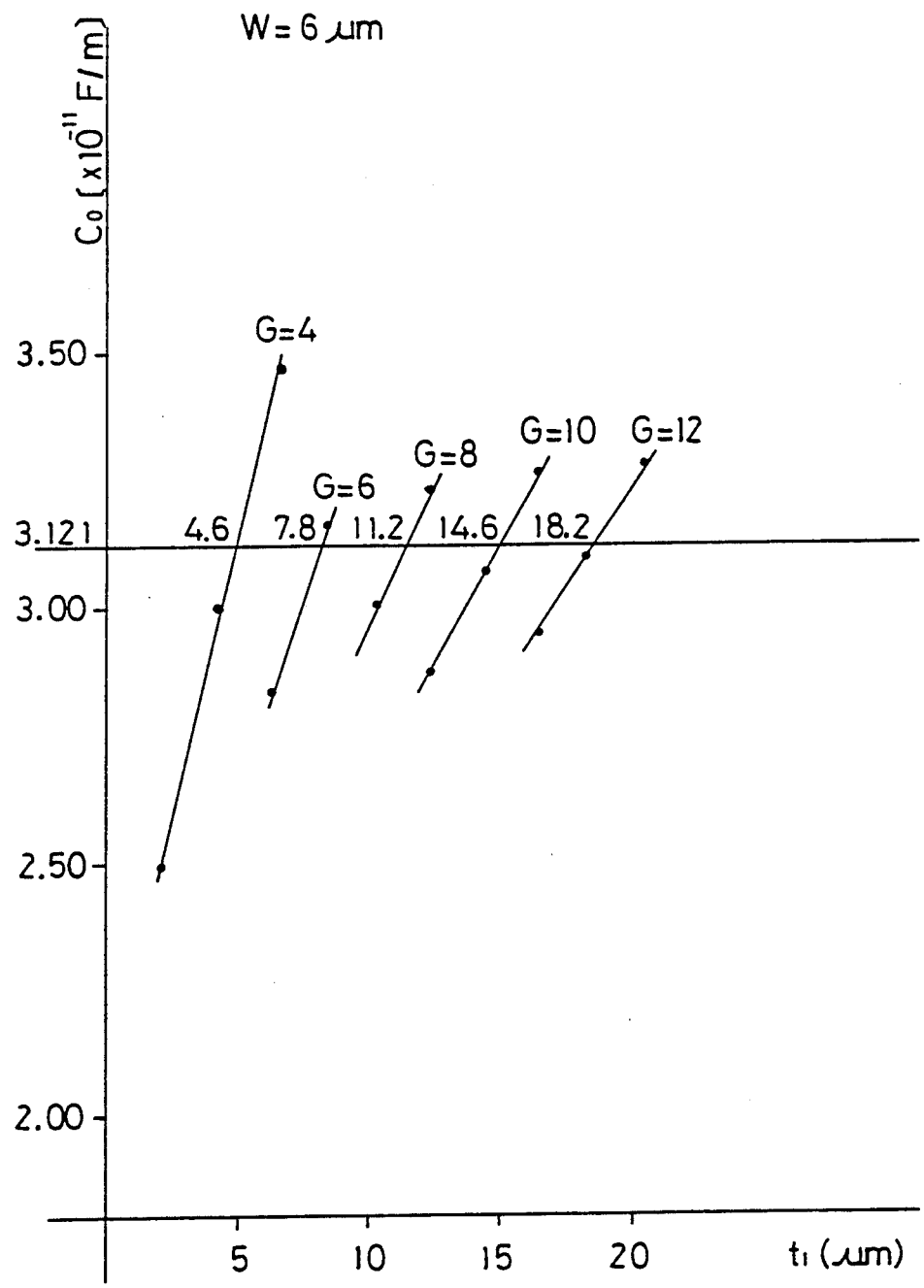
FIGS. 5 through 8 are graphs to show capacitances $C_0$ for sets of selected W, G and $t_1$.
Figure 6:
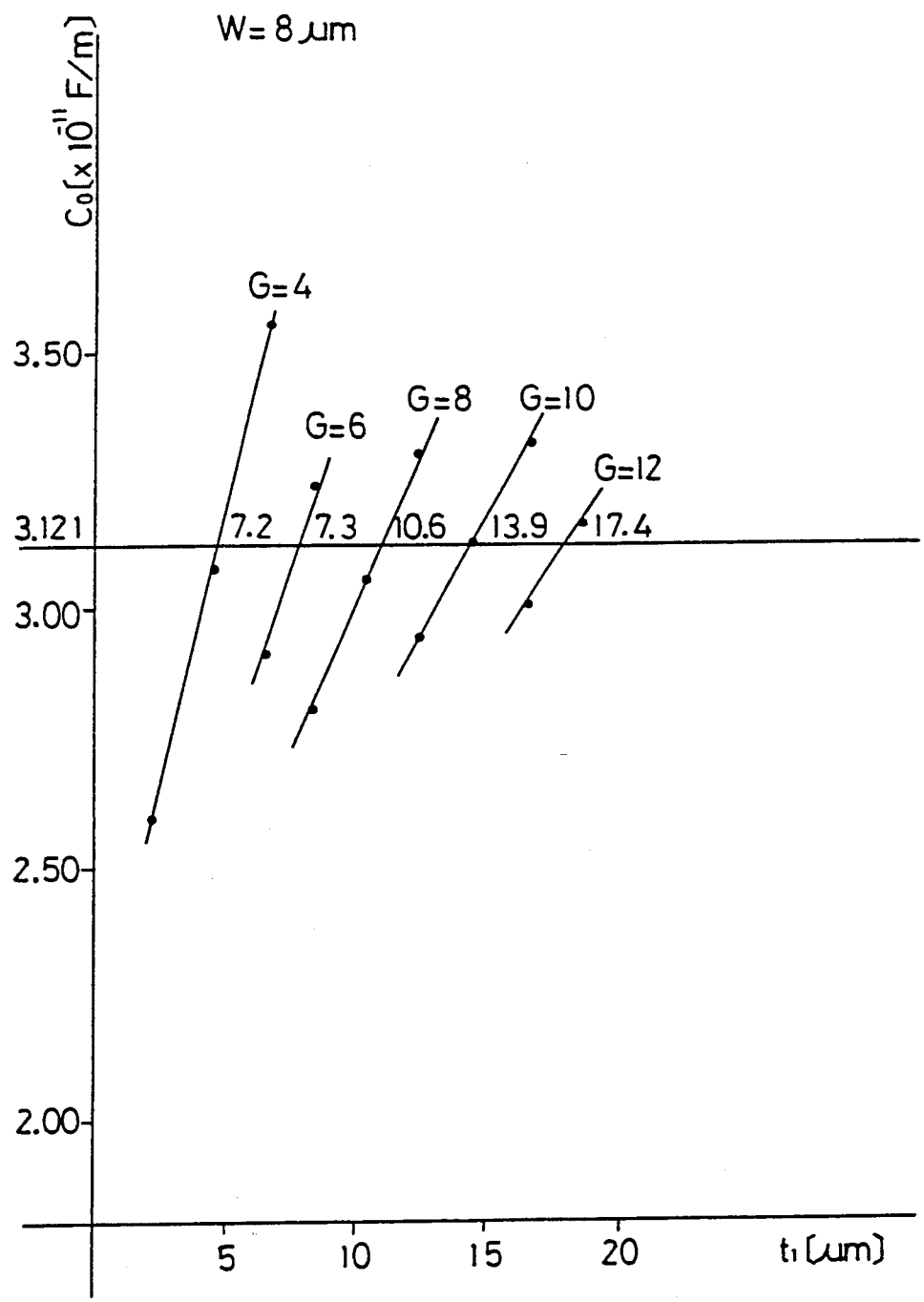
Figure 7:
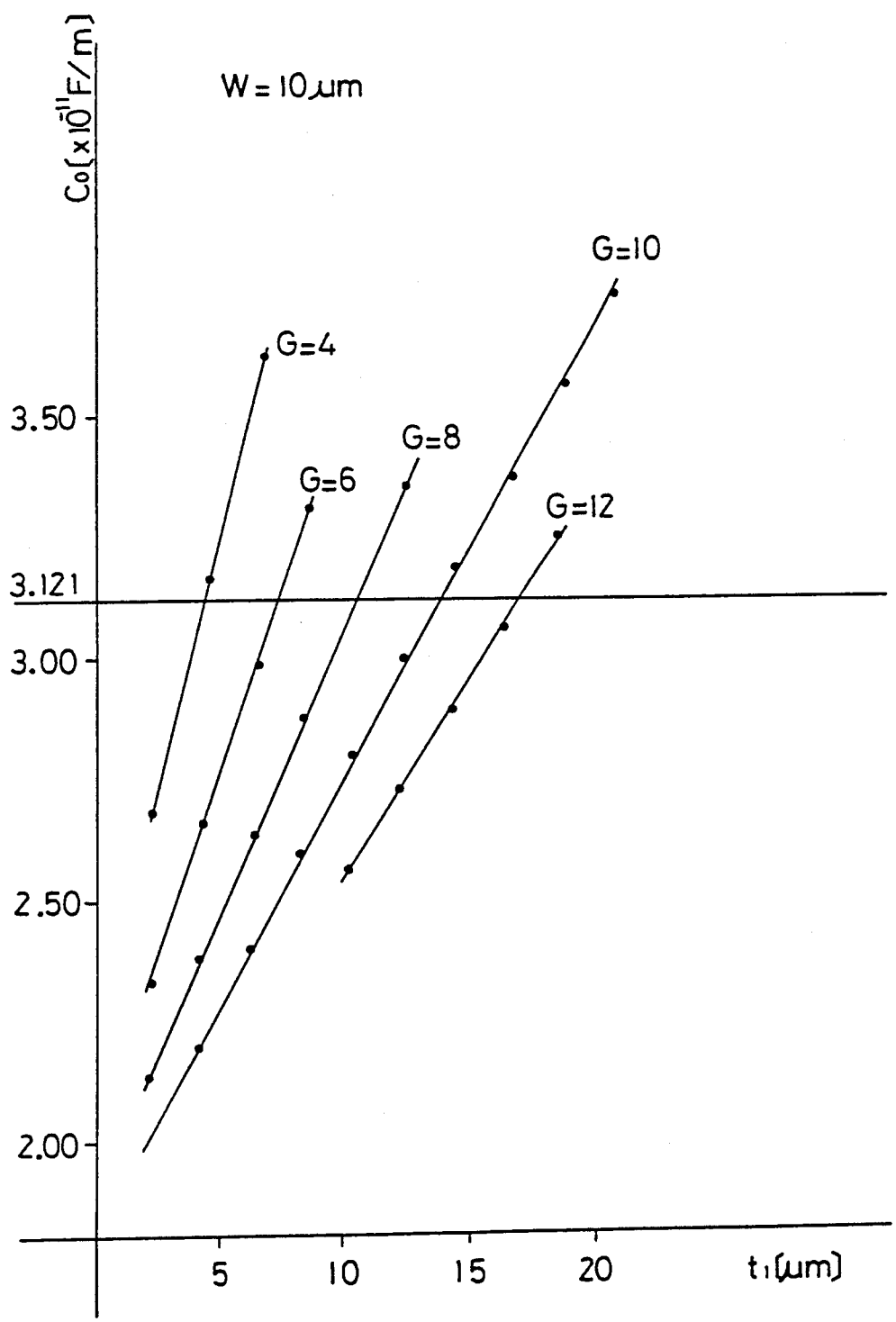
Figure 8:
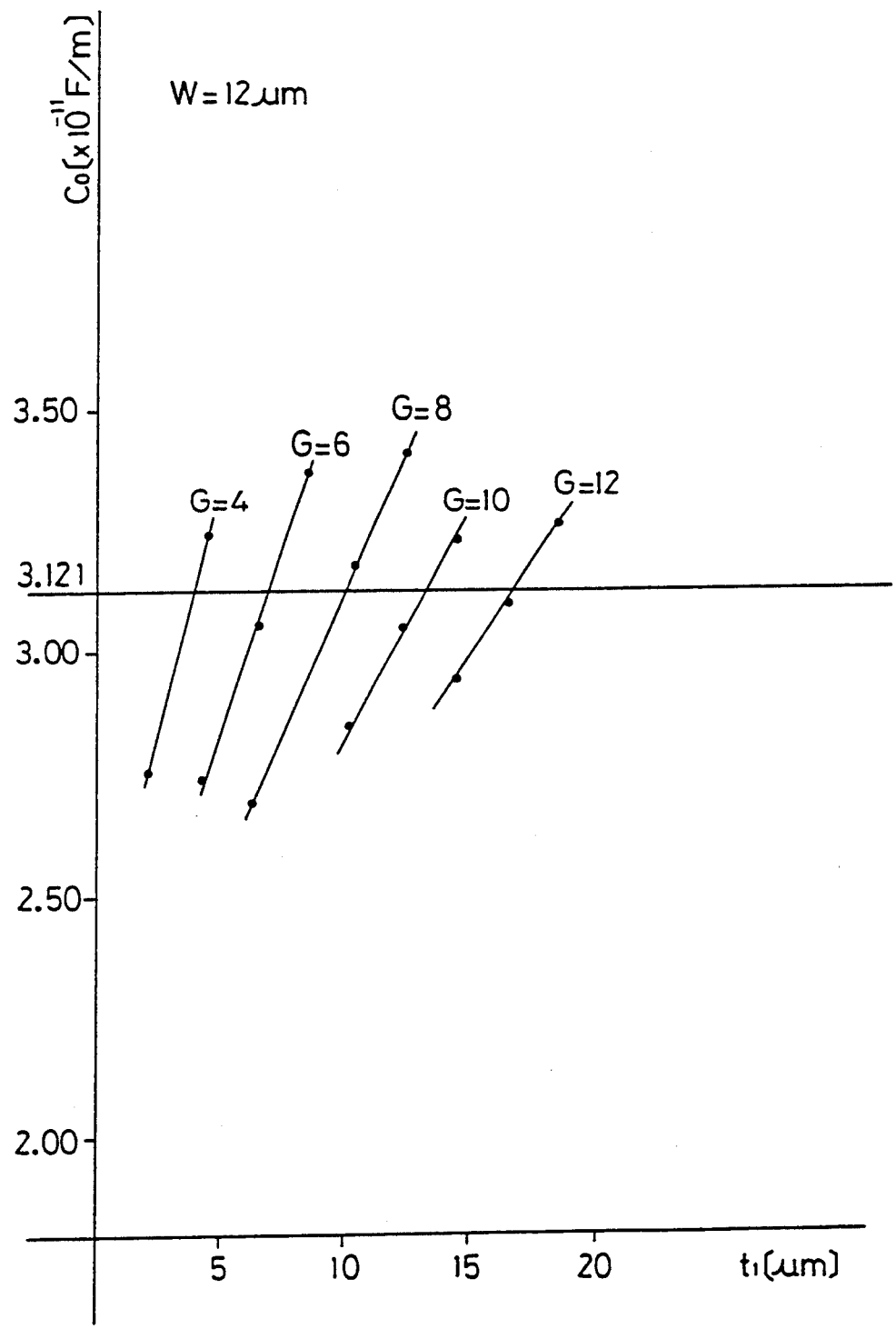

The graph in FIG. 4 shows a comparison between this invention embodiment and the prior art device wherein the thickness of the $SiO_2$ buffer layer 3 formed between the optical waveguide 2 and the electrode 4 is used as a parameter, the width a is plotted on the horizontal axis, and the calculated ratio of this invention modulation bandwidth against the prior art modulation bandwidth shown in FIGS. 2 and 3 is plotted on the vertical axis. In the calculation, the width of the electrode W is exemplified as 10 μm, the distance G between two electrodes 4, 4' as 10 μm and the thickness thereof $t_1$ as 3.0 μm in both the prior art and this embodiment.

For example, if the respective thickness $t_2$ of the $SiO_2$ buffer layer 3 is made to be 1 μm, and the width a as 4 μm, the bandwidth may be broadened by more than 2.4 times as compared with the prior art.

Although the material of which refractive index changes due to the application of an electric field is $LiNbO_3$ in the foregoing description, $LiTaO_3$ may be used to similarly realize this invention.

In order to form an optical waveguide on the substrate made of such a material, a Ti diffusion method is usually utilized to change the refractive index of a portion of the substrate. The optical waveguide is therefore formed within the substrate. However, the optical wave-guide may be laminated on the substrate, and this invention is similarly applicable to such a case. As the insulating buffer layer, $SiO_2$ may be replaced with alumina or nitride film.

The optical modulator according to this invention may be used not only as an optical phase modulator in itself but may also be inserted in one of the optical paths of a Mach-Zehnder interferometer as a component part of a light power modulator.

As stated in the foregoing, the optical modulator according to this invention enables low voltage operation with a simple structure and reduces the effective index for radio frequency to improve matching in velocity with the light as well as to expand the modulation frequency bandwidth.

The foregoing description dose not take the characteristic impedance of the electrodes into consideration. It is most effective to match the characteristic impedance of the electrodes with the characteristic impedance of a radio frequency supply system in order to operate optical modulators of the structure shown in the prior art or in this embodiment with low electric power. For instance, the characteristic impedance of a widely used coaxial cable is approximately 50Ω, and the characteristic impedance of the electrodes are preferably matched to this level. However, the devices of the prior art structure had to reduce the characteristic impedance in order to achieve a complete phase matching. Although the characteristic impedance could be reduced to 50Ω, phase matching was not possible. This invention embodiment can satisfy conditions for complete phase matching.

For this purpose, electrodes 4, 4' should be formed to have the forms and an interval distance therebetween in a manner that the capacitance $C_0$ substantially satisfies the above mentioned equation (4) for the refractive index $n_0$, and the light velocity c of the light transmitting through the optical waveguide 2 and the characteristic impedance required between the electrodes 4, 4' when it is assumed that the substrate 1, the optical waveguide 2 and the $SiO_2$ buffer layers 3 are not present. The substrate 1, the optical waveguide 2 and the buffer layers 3 are to be formed of such form and of such material that the capacitance C between 4, 4' substantially satisfies the aforementioned equation (5) if these three components are present.

The equation (5) is a formula deduced from the condition $n_m = n_0$ or the condition to coincide the phase velocity of the light with the phase velocity of the microwaves. Generally, the refractive index $n_0$ of the light is smaller than the refractive index $n_m$ of the microwaves, and the phase velocity of light is higher than the phase velocity of radio frequency. In order to achieve the condition $n_m = n_0$, the structure must lower the refractive index of the radio frequency. To satisfy the condition $n_m = n_0$, it is effective to remove the insulating buffer layer from the regions other than those on which the electrodes 4, 4' are provided. Especially when the width of an electrode 4 is made W, It is desirable to set the width a of the $SiO_2$ buffer layer 3 formed between the electrode 4 and the optical waveguide 2 as below.

$$a \leq W \tag{6}$$

Specific figures are given for a typical case where the substrate 1 is a z-plate of $LiNbO_3$, the characteristic impedance $Z_0$ is 50Ω and the light of 1.55 μm wavelength band is transmitted through the optical waveguide 2. The refractive index $n_0$ of the optical waveguide 2 for 1.55 μm is expressed as $n_0 = 2.136$.

In order to establish the relations of $Z_0 = 50Ω$ and $n_m = n_0 = 2.136$, it is obvious that the relations (7) and (8) below are obtained from the equations (4) and (5) or the equations (1) and (2).

$$C_0 = 3.12 \times 10 F/m \tag{7}$$

$$C = 1.42 \times 10 F/m \tag{8}$$

Dimensions of the device are selected to meet these conditions.

First, based on the condition for the capacitance $C_0$ expressed by the equation (7), the forms of the electrodes 4, 4' or the width W of an electrode 4, the interval distance G between the electrodes 4, 4' and the thickness $t_1$ thereof are selected. In the following description, W, G and $t_1$ are expressed in the unit of um. Description will be made to the cases with practical dimensions of $$6\ \mu m \leq W \leq 12\ \mu m,\ 4\ \mu m \leq G \leq 12\ \mu m \tag{9}$$

FIGS. 5 through 8 show calculated values of the capacitance $C_0$ for the width W of an electrode 4, the interval distance G between the electrodes 4, 4' and the thickness $t_1$ thereof. In the graphs, capacitances $C_0$ are shown as against the thickness $t_1$ of the electrodes 4, 4' when the value of W is set at 6, 8, 10 and 12 μm, G at 4, 6, 8, 10 and 12 μm.

These calculated values are obtained by the finite element method, and the direction of the width of the electrode 4 is denoted as x, the direction of the advance of the light as y and the direction perpendicular to the surface of the substrate 1 as z (optical axis) under the conditions below.

The relative permittivity of $SiO_2 = 3.75$
The relative permittivity of $LiNbO_3$ $\epsilon_z = 43$, $\epsilon_x = \epsilon_y = 28$ As shown in FIGS. 5 through 8, the capacitance $C_0$ can be expressed in a linear equation as below if the values of W and G are determined.

$$C_0 = mt_1 + b[F/m] \tag{10}$$

When the dependency of G was examined with the value W fixed, it was found that it has a quadratic relation as shown below.

$$m = a_1 G^2 + a_2 G + a_3 \tag{11}$$

$$b = a_1' G^2 + a_2' C + a_3' \tag{12}$$

When equations (10) and (11) are calculated for each value of W, the dependency of W for m may be disregarded, and the values as below are obtained.

$$\left.\begin{array}{l} a_1 = 2.281 \times 10^{-3} \\ a_2 = -0.056 \\ a_3 = 0.4245 \end{array}\right\} \tag{13}$$

For b, dependency of W exists and the relation may be regarded as linear so that relation below is obtained.

$$\left.\begin{array}{l} a_1' = (0.178 \cdot W + 2.866) \times 10^{-3} \\ a_2' = -(4.94 \times 10^{-3} \cdot W + 0.081) \\ a_3' = 0.0657 \cdot W + 2.002 \end{array}\right\} \tag{14}$$

Therefore, the capacitance $C_0$ for the width W of the electrode 4, the interval distance G between the electrodes 4, 4' and the thickness $t_1$ thereof is expressed as below.

$$C_0 = [(2.281 \times 10^{-3} \cdot G^2 - 0.056G + 0.4245)t_1 + \\ (0.178W + 2.866) \times 10^{-3} \cdot G^2 - \\ (4.94 \times 10^{-3} \cdot W + 0.081)G + \\ 0.0657W + 2.002] \times 10^{-11} \quad (15)$$

As mentioned above, $C_0$ is expressed in F/m and W, G and $t_1$ in μm. The width W, the interval G and the thickness $t_2$ are selected to hold the above equation or to coincide the value of the equation above with the value of the equation (7).

$$(2.281 \times 10^{-3} \cdot G^2 - 0.056G + 0.4245)t_1 + \\ (0.178W + 2.866) \times 10^{-3} \cdot G^2 - \\ (4.94 \times 10^{-3} \cdot W + 0.081)G + 0.0657W + 2.002 = 3.12 \quad (15')$$

Figure 9:
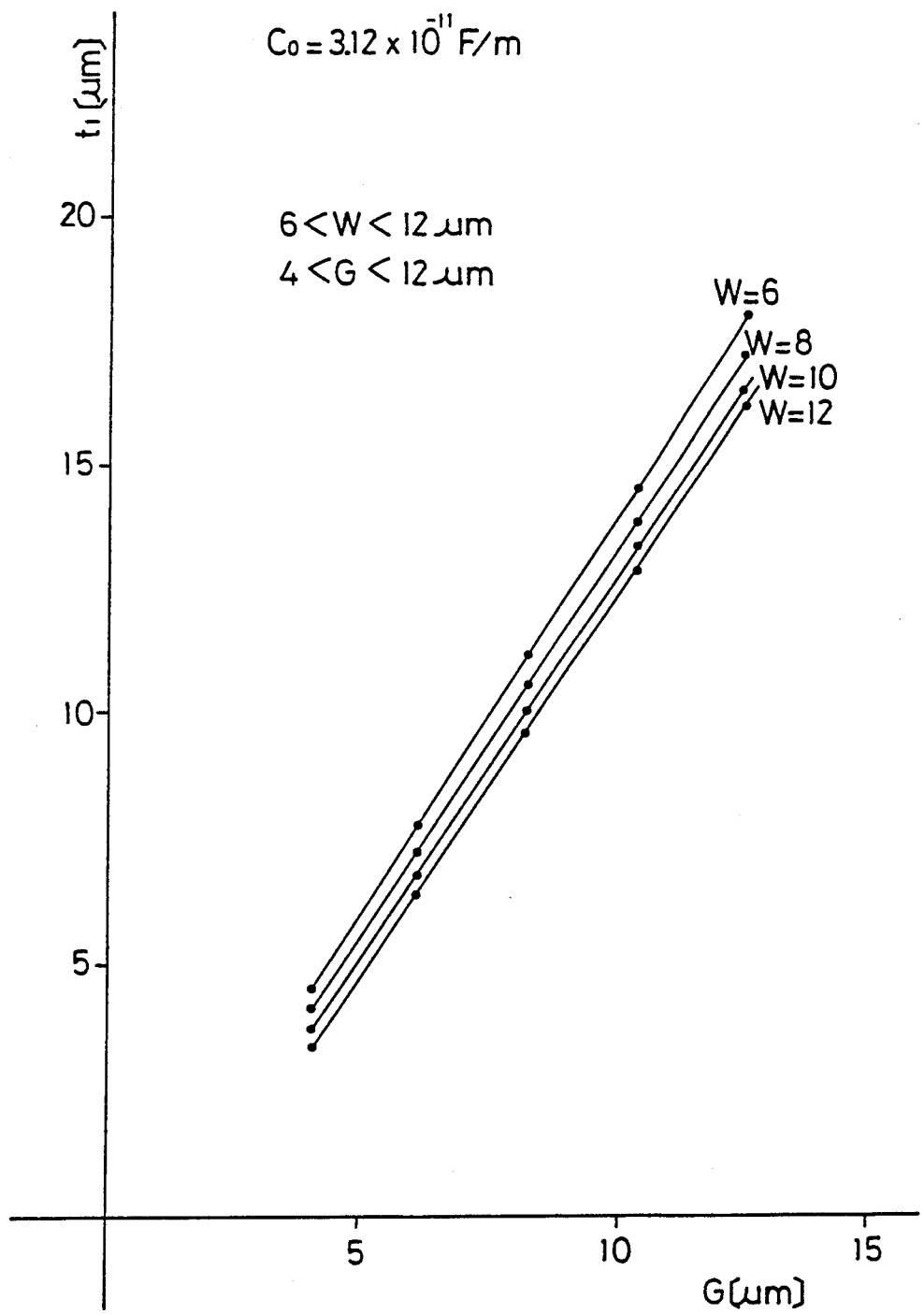
FIG. 9 is a graph to show examples of sets of W, G and $t_1$ which satisfy the conditions of $C_0$.
Figure 10:
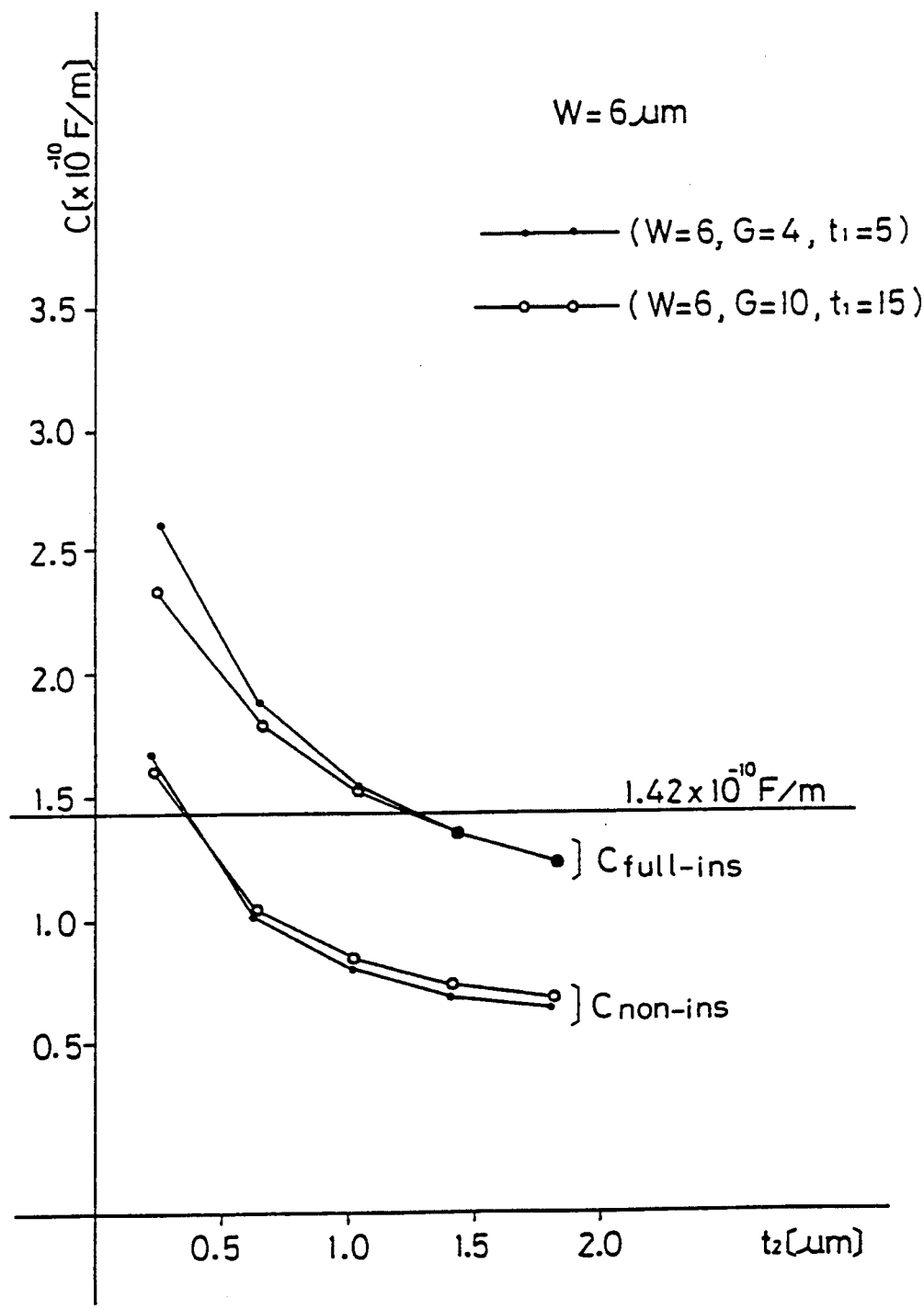
FIGS. 10 through 13 are graphs to show the relation between $t_2$ and C as against the selected sets of W, G and $t_1$.
Figure 11:
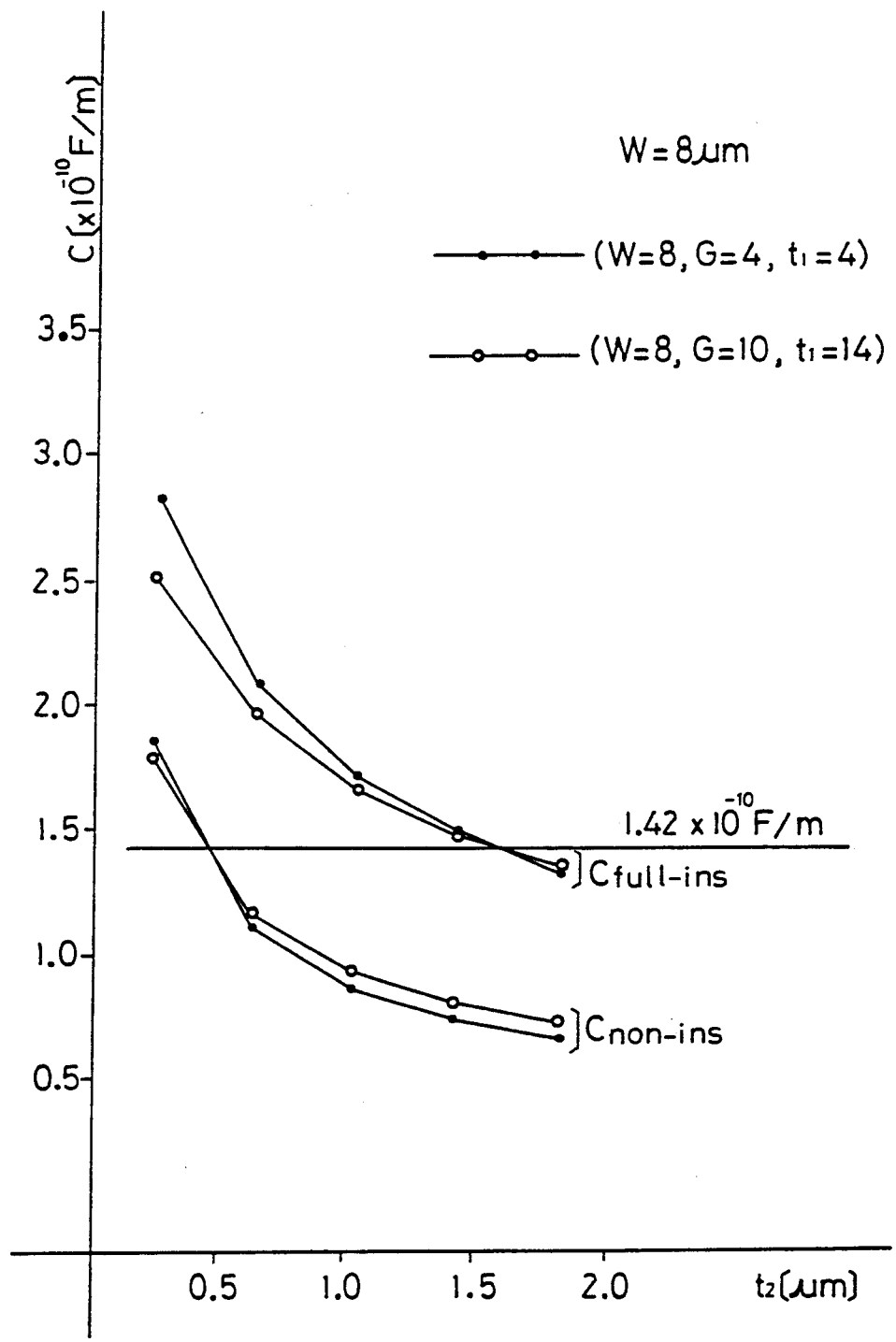

FIG. 9 is a graph to show an example of sets of W, G and $t_1$ which satisfy the equation (7). The graph is obtained by plotting the points expressed by $C_0 = 3.12 \times 10^{-11}$ F/m shown in FIGS. 5 through 8. It is approximated from the graph as below $$1.68G - 0.25W - 0.8 - t_1 = 0 \quad (16)$$

After thus selecting a set of W, G and $t_1$, the thickness $t_2$ and the width a of the $SiO_2$ buffer layer 3 are selected to satisfy the equation (8).

FIGS. 10 through 13 show the values of the capacitance C for the thickness $t_2$ of the buffer layer 3 when the values of W, $t_1$ and G are selected to satisfy the equation (7). The values are obtained by the finite element method similarly to the calculation of the capacitance $C_0$. In each of the graphs, the curve which has a greater value of C for the same set of W, G and $t_1$ indicates the value obtained when the $SiO_2$ layer is provided throughout the upper surface of the substrate 1 (on the surface where the electrodes 4, 4' are mounted). The curve with a smaller C, on the other hand, indicates the value obtained when no $SiO_2$ layer is provided or when the electrode 4, 4' are floating above the substrate 1 (only in a fictitious case).

Figure 12:
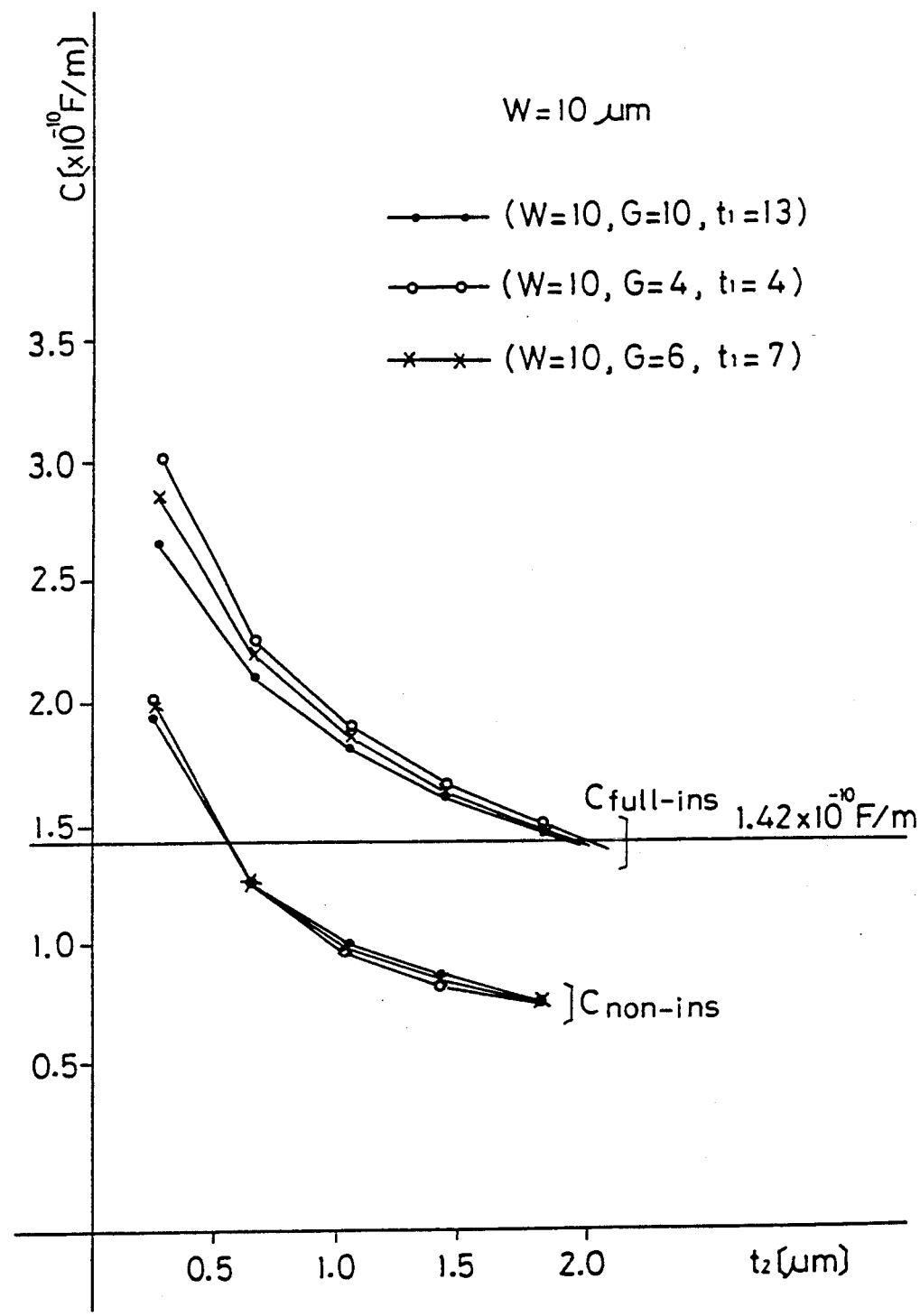
Figure 13:
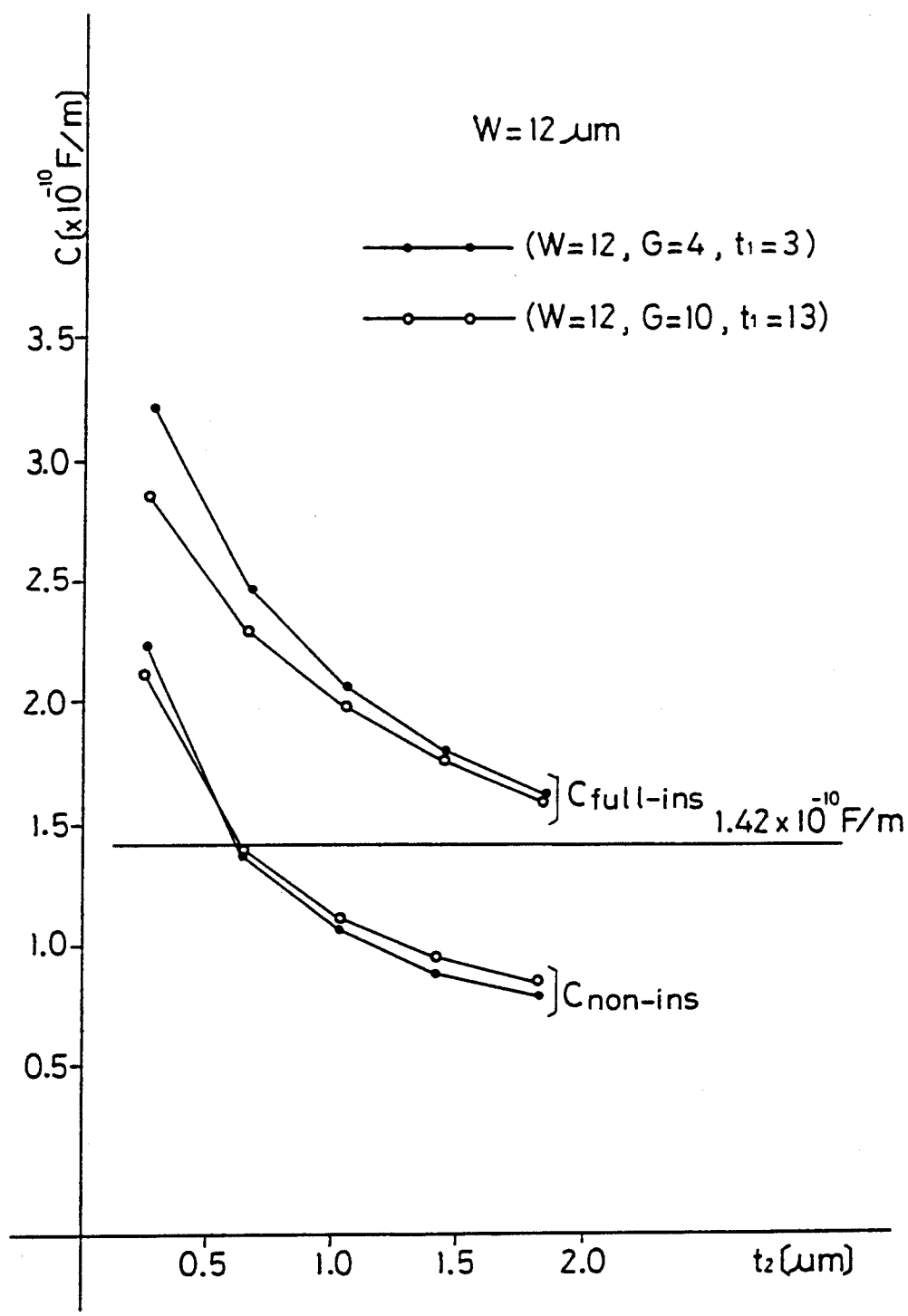

For example, if W = 10 μm as shown in FIG. 12 and the condition that $t_2 < 0.5$ μm is met, the value of the capacitance C as shown in the equation (8) cannot be obtained and even under the condition that $t_2 > 1.9$ μm, the equation (8) cannot be satisfied. But when $0.5$ μm $\leq t_2 \leq 1.9$ μm, if the value of the capacitance C is reduced by removing the $SiO_2$ layer from the surface except for the region where the electrodes 4, 4' are provided, the equation (8) can be satisfied. In other words, the equation (8) does not hold if the layer remains all over the surface.

The value of the capacitance C depends mainly on the width W of the electrode 4, the thickness $t_2$ and the width a of the $SiO_2$ buffer layer 3. Therefore, an approximation is made in a manner similar to the deduction of the equation (15) for the capacitance $C_{non-ins}$ for the case where the $SiO_2$ buffer layer 3 is assumed to be non-existent, and for the capacitance $C_{full-ins}$ for the case where the layer 3 is assumed to exist all over the surfaces of the substrate 1 and the optical waveguide 2. The result is obtained as below.

$$C_{non-ins} = [(0.238W + 0.367)t_2^2 - \\ (0.0857W + 1.137)t_2 + \\ 0.105W + 1.316] \times 10^{-10} \quad (17)$$

$$C_{full-ins} = [0.485t_2^2 - (0.0103W + 1.727)t_2 + \\ 0.096W + 2.254] \times 10^{-10} \quad (18)$$

wherein W and $t_2$ are expressed in the unit of μm, and $C_{non-ins}$ and $C_{full-ins}$ in the unit of F/m.

The capacitance C of the device which is manufactured in practice is expressed as below.

$$C_{non-ins} < C \leq C_{full-ins} \quad (19)$$

Therefore, the conditions below are required when the equation (8) is taken into consideration.

$$C_{non-ins} < 1.4245 \times 10^{-10} \leq C_{full-ins} \quad (20)$$

Figure 14:
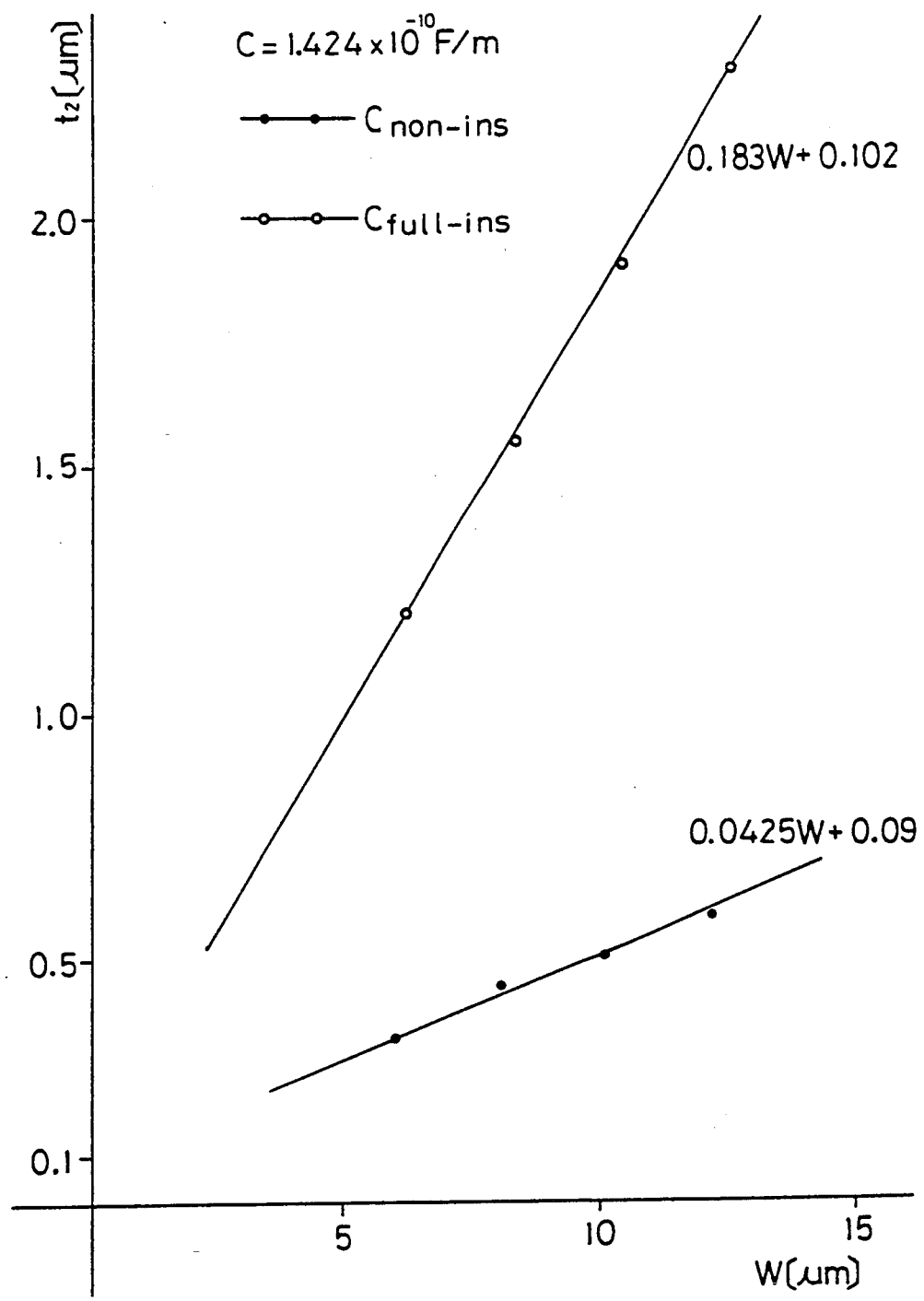
FIG. 14 is a graph to show the relation between W and $t_2$ which satisfy the conditions of C.

FIG. 14 shows the relation of W and $t_2$ from which the equation (20) is obtained within the range limited by the equation (9). W and $t_2$ should have the relation below. They are expressed in the unit of μm.

$$0.0425W + 0.09 < t_2 \leq 0.183W + 0.102 \quad (21)$$

FIG. 15 shows the changes in the capacitance C as against the width a of the $SiO_2$ buffer layer 3 when W, G, $t_1$ and $t_2$ are selected to satisfy the above conditions. In the example shown, W = 10 μm, G = 10 μm, $t_1 = 13$ μm and $t_2 = 1$ μm. In the range of $a \leq W$, the relation expressed below substantially holds. Therefore, if $a = 5$ μm, the equation (8) is almost satisfied.

$$C \approx C_{non-ins} + 0.9(C_{full-ins} - C_{non-ins}) \times (a/W) \quad (22)$$

Conversely, if W = 10 μm, G = 10 μm, $t_1 = 13$ μm, $t_2 = 1$ μm, $a = 5$ μm, and L = 1 cm, the refractive index $n_m$ for microwaves, characteristic impedance $Z_0$ and modulation bandwidth $\Delta f$ become as expressed below to almost satisfy the desired conditions.

$$n_m = 2.139, \; Z_0 = 50.6[\Omega], \; \Delta f = 3{,}700[\text{GHz}]$$

FIGS. 16 through 21 show examples of calculation to obtain an optical modulator of $Z_0 = 40\Omega$ and the refractive index $n_m = 2.272$. These graphs show the calculated values similar to those in FIGS. 9 through 14.

Based on the equations (2) and (1), they should meet the conditions below.

$$C_0 = 3.67 \times 10^{-11} [F/m] \quad (7)'$$

$$C = 1.89 \times 10^{-10} [F/m] \quad (8)'$$

Figure 16:
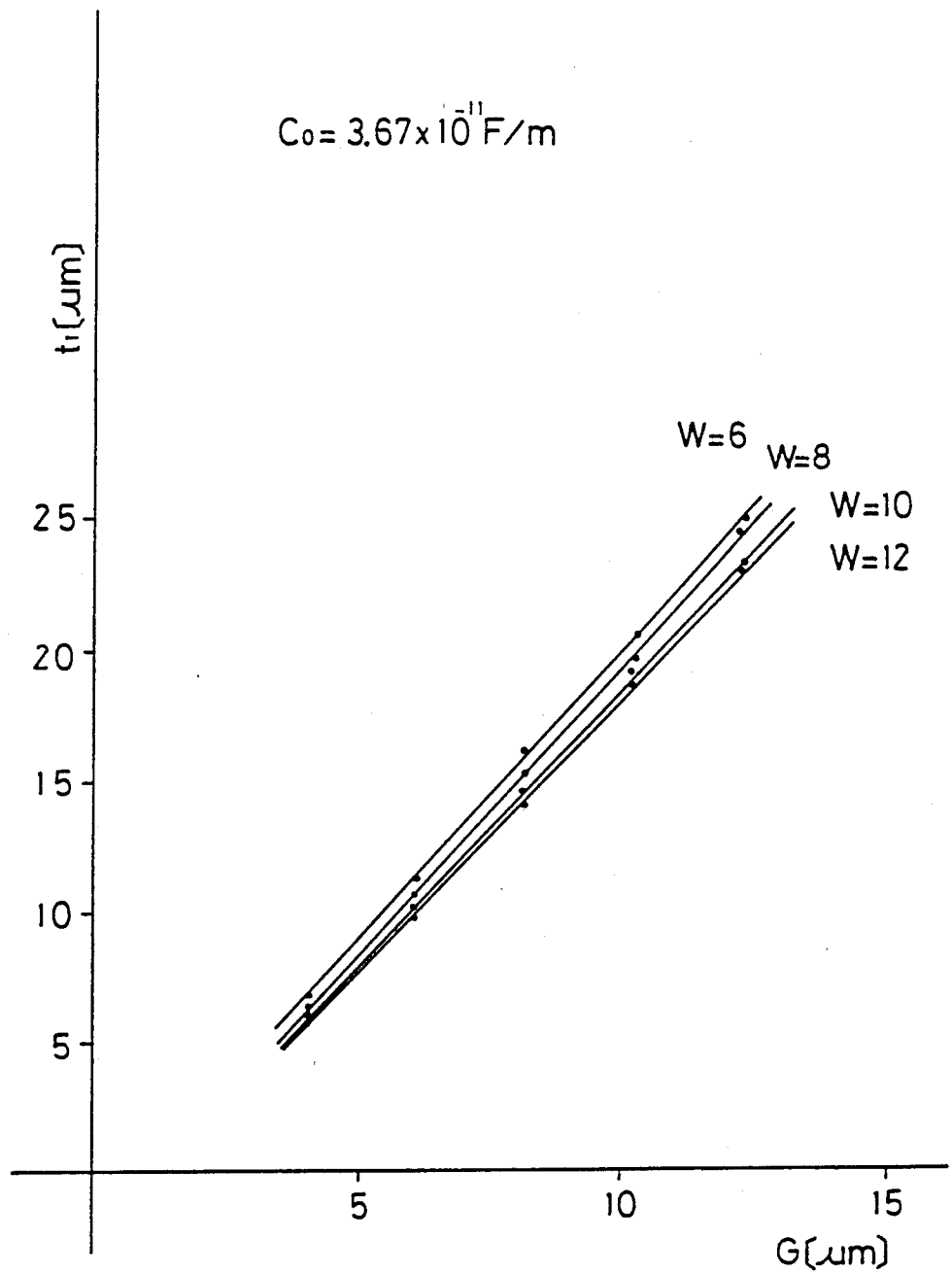
FIG. 16 is a graph to illustrate by comparative examples the sets of W, G and $t_1$ which satisfy the conditions of $C_0$.
Figure 17:
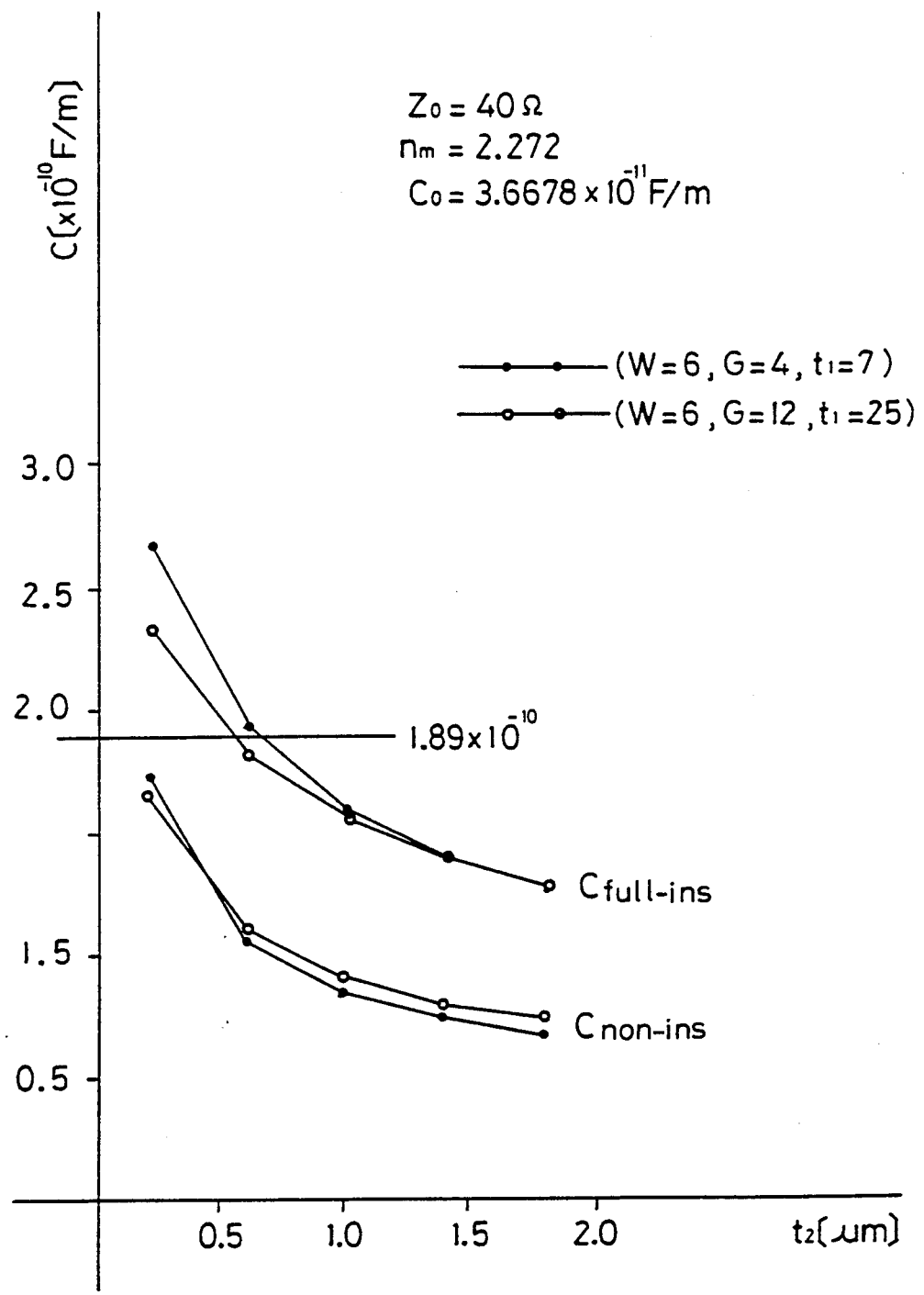
FIGS. 17 through 20 are graphs to show the relations between $t_2$ and C as against the selected W, G and $t_1$.
Figure 18:
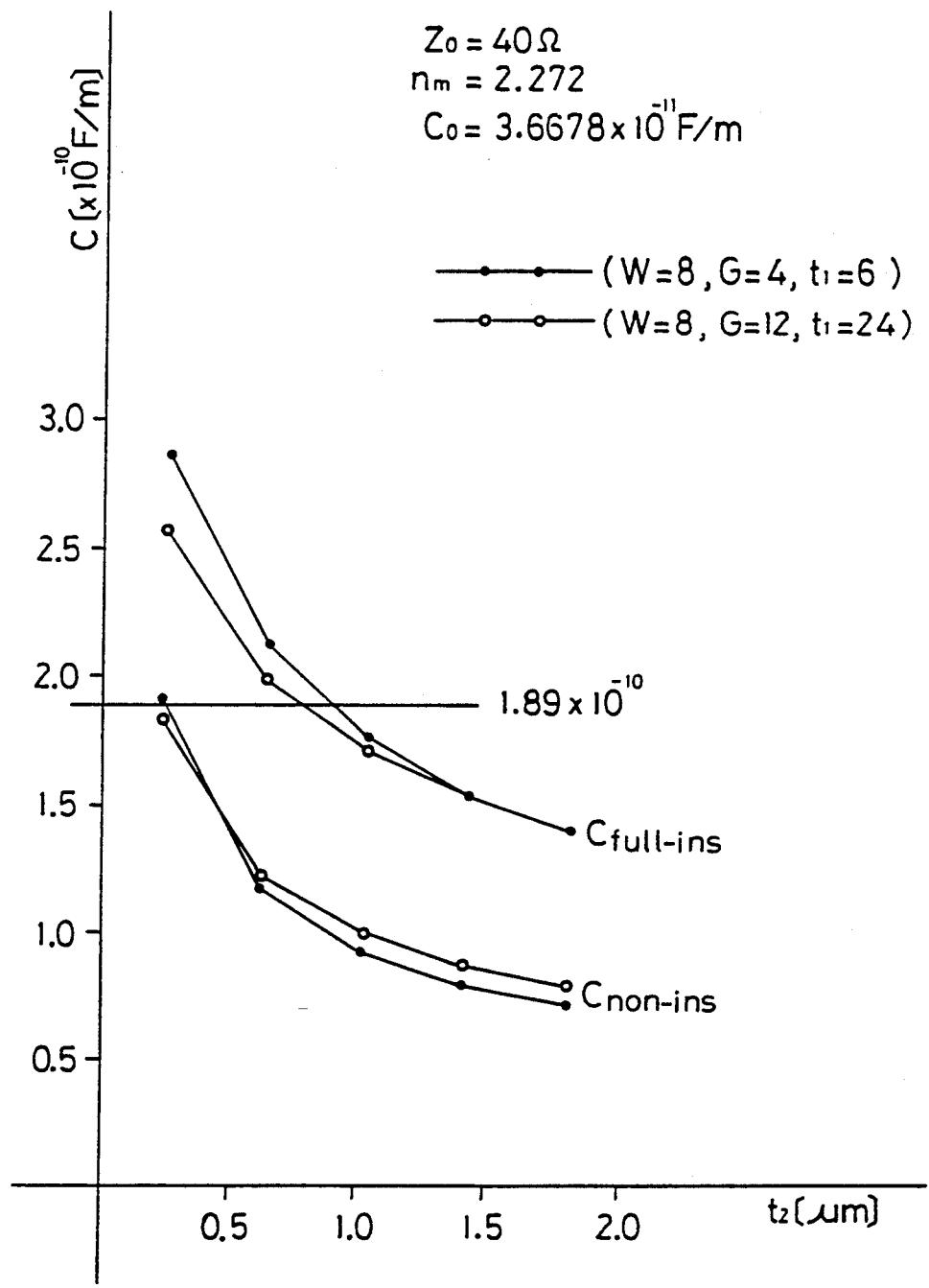
Figure 19:
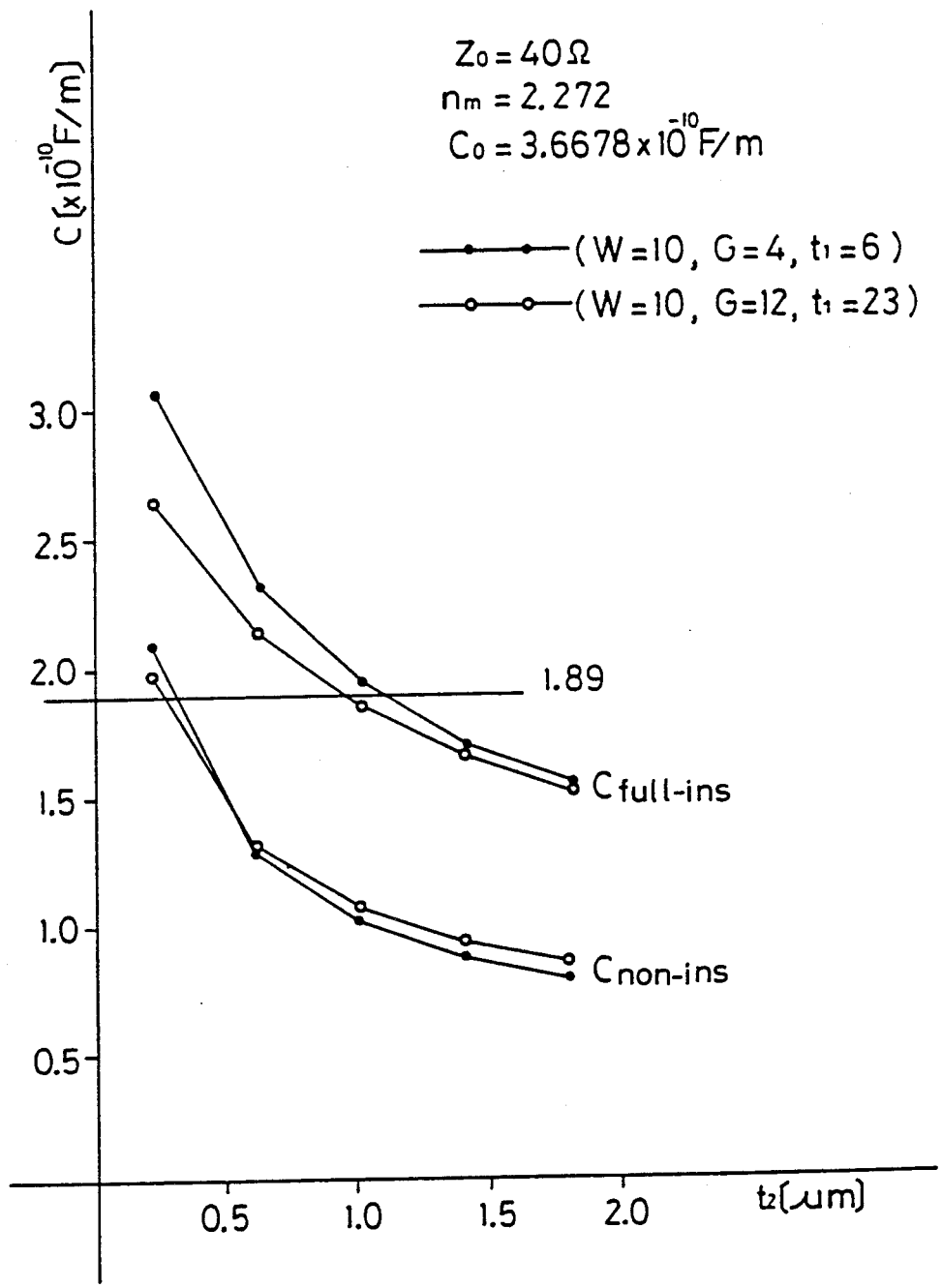
Figure 20:
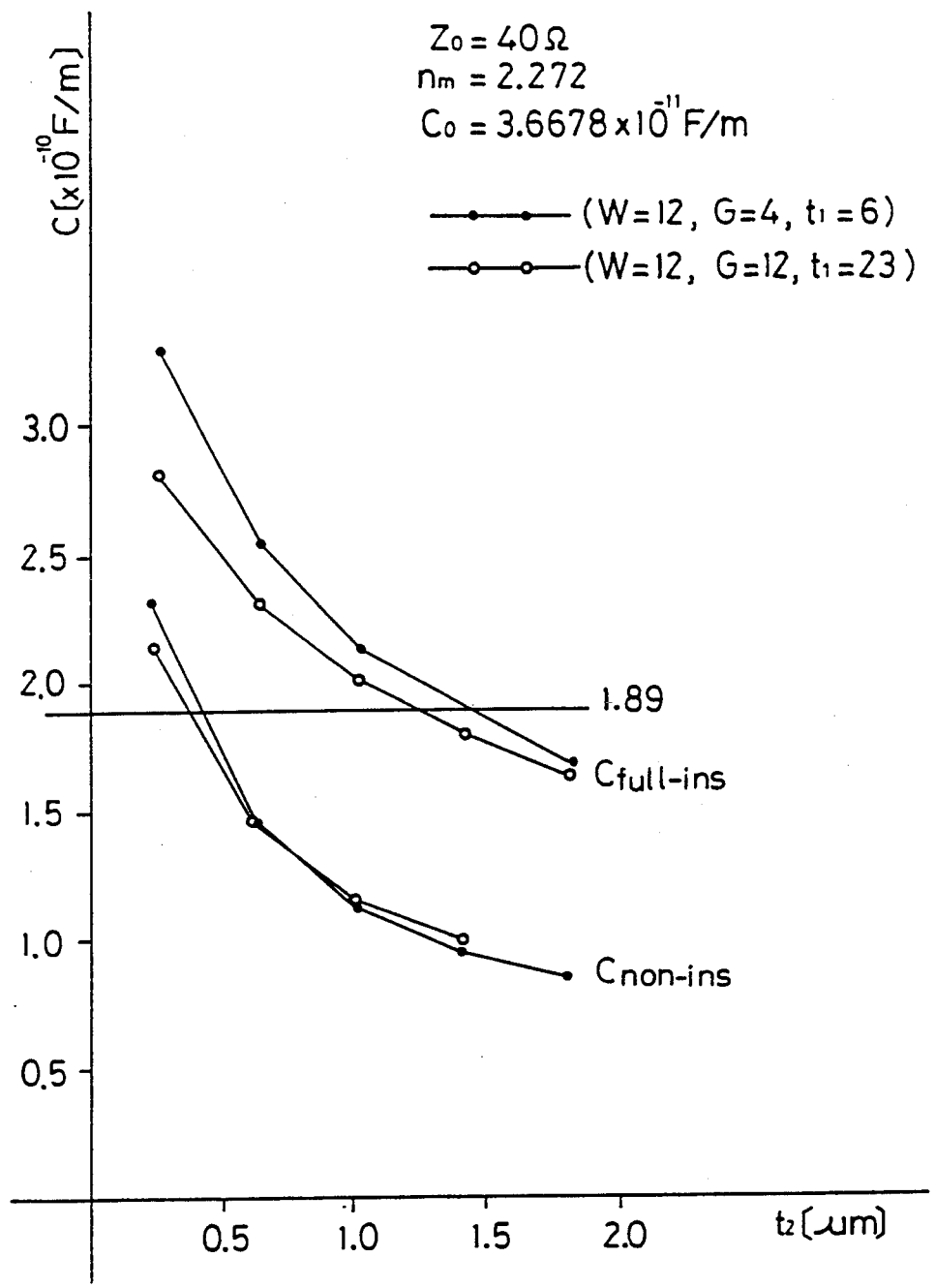
Figure 21:
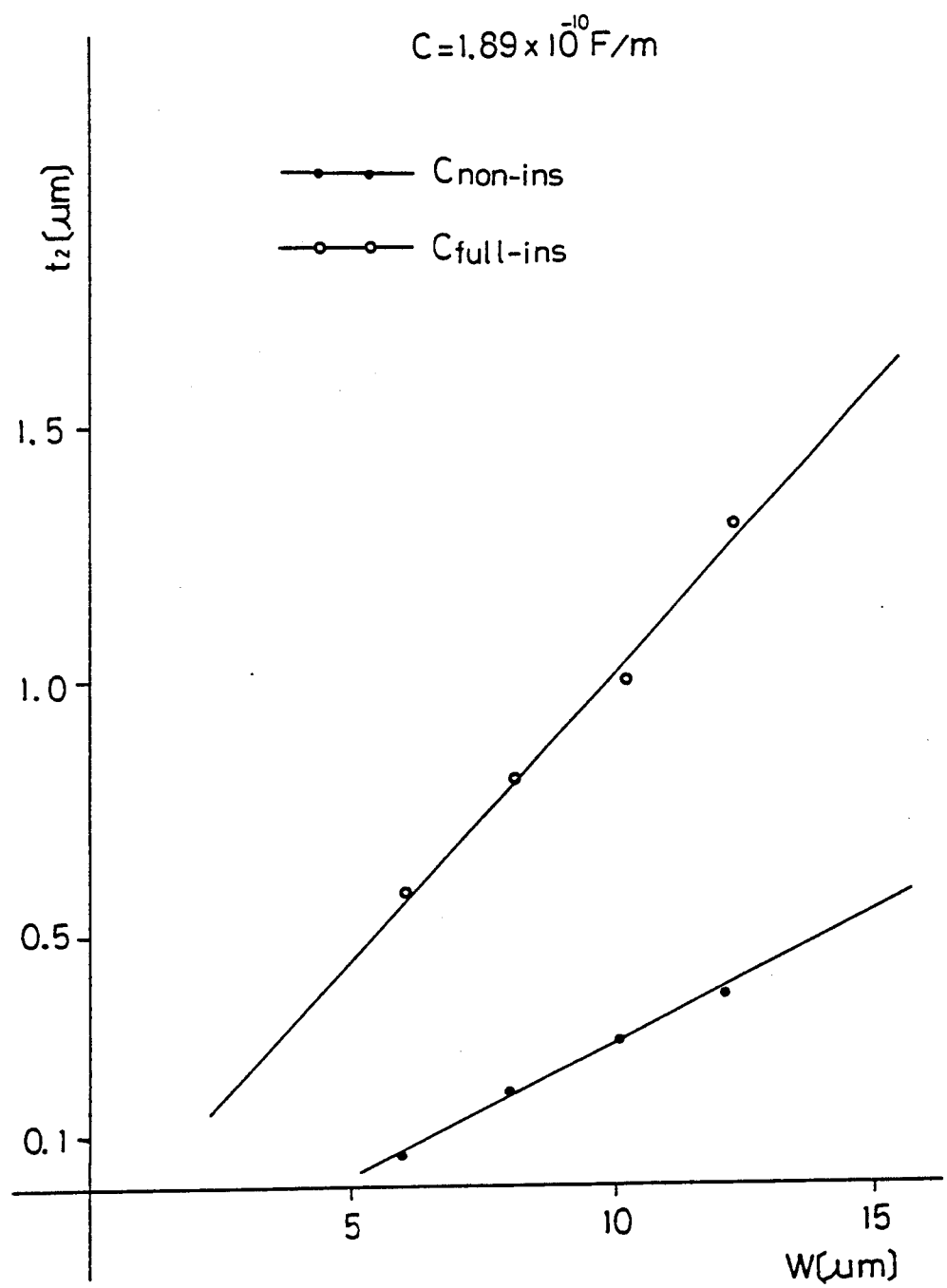
FIG. 21 is a graph to show the relation between W and $t_2$ to satisfy the conditions of C.

FIG. 16 shows an example of the set of W, G and $t_1$ which satisfies the equation (7)' while FIGS. 17 through 20 the value of C for $t_2$ when the set of W, G and $t_1$ is selected to satisfy the equation (7)' while FIG. 21 shows the relation between W and $t_2$.

In the above statement, description was made for the case where light of 1.55 μm is transmitted through an optical waveguide of z-plate $LiNbO_3$. However this invention can be realized similarly even when other crystal orientation or an other material such as $LiTaO_3$ are used as the optical waveguide. Moreover, this invention can be realized when other wavelength light is transmitted on the condition that the refractive index of the light $n_0$ is known. The relation between the transmitted wavelength and the refractive index of the light is shown below

| wavelength (μm) | refractive index $n_0$ |
|---|---|
| 0.63 | 2.189 |
| 1.3 | 2.145 |
| 1.55 | 2.136 |

The characteristic impedance $Z_0$ may be set at a value other than 50Ω so far as to match the characteristic impedance of the power supply system.

All the above calculations were conducted for the case where the optical waveguide is formed within a substrate, but this invention may be similarly realized for the case where the optical waveguide is laminated on a substrate.

This invention as described in the foregoing statement can substantially match the phase velocity of the high frequency which is applied as modulation signal (group velocity) with the phase velocity of the light which is a carrier, and further can match the characteristic impedance of the electrodes with the characteristic impedance of the power supply system. In other words, this invention can expand the modulation bandwidth by matching the phase velocities (group velocities). It is effective in that low voltage driving becomes possible by matching of impedances.

What is claimed is:

1. An optical modulator comprising:
   a substrate formed of a material which has a refractive index that changes when an electric field is applied;
   an optical waveguide formed in contact with said substrate;
   a plurality of insulating buffer layers formed on surfaces of the optical waveguide and of the substrate, and
   means for applying an electric field which causes a radio frequency electric field onto said optical waveguide via said insulating buffer layer, said applying means including a first electrode arranged along said optical waveguide and a second electrode arranged in parallel to said first electrode,
   wherein said insulating buffer layers include a first region formed between said first electrode and said optical waveguide having a width equal to or narrower than a width of the first electrode, and a second region formed between said second electrode and said substrate,
   wherein the first and second electrodes are formed in such a shape and with such an interval distance therebetween as to establish a relation of $C_0 = 1/(c \cdot n_0 \cdot Z_0)$ among a static capacitance $C_0$ of a time when said substrate, optical waveguide and insulating buffer layers are assumed not to exist, a refractive index $n_0$ of said optical waveguide against transmitting light, a velocity of light c, and a characteristic impedance $Z_0$ required between said first and second electrodes, and that said substrate, said optical waveguide and said insulating buffer layers are formed in such a form and arrangement of such a material as to substantially establish the relation of $C = n_0/(Z_0 \cdot c)$ with the static capacitance C between said first and second electrodes.

2. The optical modulator as claimed in claim 1 wherein the second region has a width equal to or narrower than a width of the second electrode.

3. The optical modulator as claimed in claim 1 wherein if the substrate is a z-plate of $LiNbO_3$, the characteristic impedance is 50Ω and the light of 1.55 μm wavelength band is transmitted through the optical waveguide, the relations below substantially hold, $$C_0 = 3.12 \times 10^{-11} [F/m] \quad (7)$$

$$C = 1.42 \times 10^{-10} [F/m] \quad (8)$$

4. The optical modulator as claimed in claim 3 wherein the relation expressed by the equation below holds among the width W of the first electrode, the thickness $t_1$ thereof, the interval distance G between said first and second electrodes expressed in the units of μm $$(2.281 \times 10^{-3} \cdot G^2 - 0.056G + 0.4245)t_1 + (0.178W + 2.866) \times 10^{-3} \cdot G^2 - (4.94 \times 10^{-3} \cdot W + 0.081)G + 0.0657W + 2.002 = 3.12$$

5. The optical modulator as claimed in claim 3 wherein the insulating buffer layers are made of $SiO_2$, a capacitance $C_{non-ins}$ between the first and second electrodes when the insulating layers do not exist and the thickness $t_2$ of the buffer layers and the width W of the first electrode are expressed in the unit of μm respectively, satisfying the relation of $$C_{non-ins} = [(0.238W + 0.367)t_2^2 - (0.0857W + 1.137)t_2 + 0.105W + 1.316) \times 10^{-10} < 1.42 \times 10^{-10} [F/m]$$

and a capacitance $C_{full-ins}$ between the first and second electrodes if assumed that the insulating buffer layers are provided all over the surfaces of the substrate and the optical waveguide, satisfying the relation $$C_{full-ins} = [0.485t_2^2 - (0.0103W + 1.727)t_2 + 0.096W + 2.254) \times 10^{-10} \geq 1.42 \times 10^{-10} [F/m]$$

6. The optical modulator as claimed in claim 5 wherein the thickness $t_2$ of the insulating buffer layers has the relation with the width W of the first electrode as expressed below when thicknesses are expressed in units of μm:

$$0.0425W + 0.09 < t_2 < 0.183W + 0.102.$$

7. The optical modulator of claim 1, wherein said optical waveguide is upon said substrate.

8. The optical modulator of claim 1, wherein said optical waveguide is within said substrate.

* * * * *